(12) United States Patent  
Singh

(10) Patent No.: US 6,850,661 B2
(45) Date of Patent: Feb. 1, 2005

(54) MULTIPLE ELEMENT CONTROLLED OPTICAL COUPLING

(75) Inventor: Daljeet Singh, Saratoga, CA (US)

(73) Assignee: Vitesse Semiconductor Corporation, Camarillo, CA (US)

(*) Notice: Subject to any disclaimer, the term of this patent is extended or adjusted under 35 U.S.C. 154(b) by 336 days.

(21) Appl. No.: 10/222,341

(22) Filed: Aug. 16, 2002

(65) Prior Publication Data

US 2003/0170023 A1 Sep. 11, 2003

Related U.S. Application Data

(60) Provisional application No. 60/363,723, filed on Mar. 11, 2002.

(51) Int. Cl.[7] .................................................. G02B 6/42
(52) U.S. Cl. ........................................... 385/17; 385/25
(58) Field of Search .............................. 385/17, 25, 75, 385/101, 18, 33, 20, 21; 356/138, 141.3, 141.1, 141.4, 139.5, 149

(56) References Cited

U.S. PATENT DOCUMENTS

| | | | | |
|---|---|---|---|---|
| 3,762,795 A | * | 10/1973 | Bezu | 359/555 |
| 4,772,121 A | * | 9/1988 | Trageser | 356/139.05 |
| 6,005,998 A | * | 12/1999 | Lee | 385/33 |
| 6,330,102 B1 | | 12/2001 | Daneman et al. | |
| 6,556,287 B1 | * | 4/2003 | Dennis | 356/138 |
| 6,568,627 B1 | * | 5/2003 | Jones et al. | 244/3.13 |
| 6,594,448 B2 | * | 7/2003 | Herman et al. | 396/21 |
| 6,650,407 B2 | * | 11/2003 | Jamieson et al. | 356/141.1 |
| 6,665,063 B2 | * | 12/2003 | Jamieson et al. | 356/141.1 |
| 2002/0126967 A1 | * | 9/2002 | Panak et al. | 385/101 |
| 2004/0008925 A1 | * | 1/2004 | Chen et al. | 385/18 |

* cited by examiner

*Primary Examiner*—Thien M. Le
(74) *Attorney, Agent, or Firm*—Christie, Parker & Hale, LLP

(57) ABSTRACT

An optical cross connect with simultaneous correction of multiple mirror angles to achieve desired output power. In one embodiment beam offset and pointing angle are changed and output power is measured to determine changes to mirror angles.

30 Claims, 3 Drawing Sheets

MULTIPLE ELEMENT CONTROLLED OPTICAL COUPLING

CROSS REFERENCE TO RELATED APPLICATION

This application claims the benefit of U.S. provisional patent application No. 60/363,723, entitled Multiple Element Controlled Optical Coupling, filed Mar. 11, 2002, the disclosure of which is incorporated by reference.

BACKGROUND OF THE INVENTION

The present invention relates generally to optical switches, and more particularly to 3D optical switches using controllable mirrors.

Optical switches are useful in communications networks for routing signals from an incoming channel to an outgoing channel. Often, optical switches have multiple input ports and multiple output ports. Each port contains a fiber optic cable providing a data stream to or receiving a data stream from the switch.

Optical switches are generally configurable, so that an input port may have its data routed to any of multiple output ports. This selective routing is often achieved using a set of mirrors and other optical elements. Generally, light is received from an optical fiber and passes through a set of input optics. The light is reflected using one or more mirrors to a desired output optical fiber, with the light passing through a set of output optics prior to coupling to the output optical fiber. Each of the mirrors is usually finely controlled in order to ensure that the light arrives at the proper output optical fiber with a desired coupling efficiency.

In addition to simply providing a beam to the proper output fiber, the position of the beam on the output fiber is often important as well. In order for the maximum amount of light to enter the output fiber, the beam usually should be coincident with the center axis of the fiber and perpendicular to the surface of the fiber. The angle at which the beam strikes the fiber may be referred to as the pointing angle. The distance between the center axis of the fiber and the point at which the beam is incident on the fiber may be referred to as the offset. Misalignment of the beam on the optics of the output port—in pointing angle, offset, or both—may result in insufficient light being transferred to the fiber for the communications network to function effectively.

Often, the mirrors cannot simply be moved to predetermined positions to couple a particular output port to an input. Due to factors such as temperature, manufacturing tolerances, vibration, age, and other factors, simply moving the mirrors to predetermined positions may not guarantee optimum coupling between input and output ports. Thus, a control system may be used to ensure that the desired coupling between the input and output is achieved. Both the angle of incidence of the light and its position on the fiber may be controlled, in both the azimuth and elevation dimensions. However, generally only a single observable, a measured output power, is available for determining the appropriateness of mirror positions. The availability of only a single observable generally results in changing only one parameter associated with mirror positions at any given time. Use of a process which changes a single parameter associated with beam aiming at a time may result in delays in appropriately adjusting aim of a light beam and could cause the algorithm to get caught at a local maxima instead of the global maxima. Further, implementing changes in the aim of a light beam may result in increasing error if measurement errors occur.

SUMMARY OF THE INVENTION

The present invention provides a 3D optical switch using controllable mirrors. The switch allows light from an input port to be selectively provided to an output port. In one aspect the invention includes a process of coupling inputs and outputs in an optical cross connect, with a particular input and a particular output being coupled by a first mirror moveable in azimuth and elevation and a second mirror moveable in azimuth and elevation, the process comprising selecting a desired output beam power, changing the azimuth and elevation of the first and second mirrors, thereby causing a beam provided by the particular input to traverse a number of points, measuring output power provided to the particular output, comparing the measured output power to a desired output power, and performing changes in the azimuth and elevation of the first and second mirrors based on the measured output power.

In another aspect the invention includes a 3D optical switch comprising a plurality of inputs and outputs, the inputs and outputs adapted to receive and transmit light, respectively, a plurality of moveable mirrors, the moveable mirrors moveable in an azimuth direction and an elevation direction, a power monitor, the power monitor measuring the intensity of a beam at at least one of the outputs, and a controller, the controller receiving data from the power monitor, and adjusting the positions of the moveable mirrors in response to intensity data received from the power monitor.

These and other aspects of the present invention may be more readily understood by way of the following detailed description and accompanying figures.

DETAILED DESCRIPTION

Figure 1:
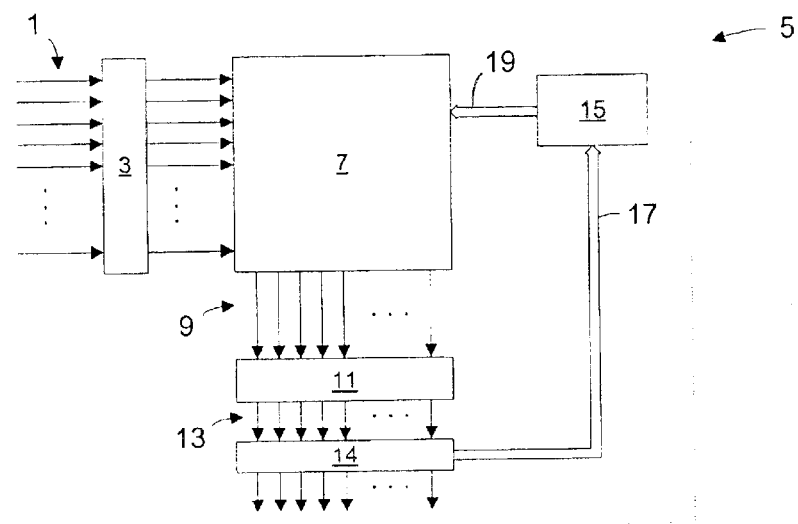
FIG. 1 illustrates a block diagram of an optical switch in accordance with the present invention.

FIG. 1 is a block diagram of an optical switch and controller. In FIG. 1, optical fibers 1 provide optical data signals to input optics 3 of an optical switch 5. The input optics may include one or more collimating lenses or other optical elements. The optical data signals pass through the input optics to an optical matrix 7 of the optical switch. The optical matrix is configurable such that the input optical data signals to the switch can be selectively coupled to desired output ports. The switched signals 9 output by the optical matrix are passed through output optics 11. The switched signals pass through the output optics to optical fibers. The output optics may include, for example, further collimating lenses, or more likely a lens assembly which collimates and refocuses the switched signals into the optical fibers.

The optical matrix may include a mirror associated with each input port and a mirror associated with each output port. In many configurations, however, a mirror is associated with a single input port, and potentially multiple mirrors are associated with each output port. At times this is due to the relatively large transmission distance between input port mirrors and output port mirrors compared with the distance between output port mirrors and output ports associated with those output port mirrors. The differing relative distances allow the input port mirrors to direct light to a larger area while still having the light incident approximate the mechanical axis of the mirror, which is sometimes a factor due to buckling of the mirror or variations in the mirror surface. In one embodiment, the mirrors are discrete mirror assemblies.

Returning to FIG. 1, the output fibers provide the light, or a portion of the light in some embodiments, to a power monitor 14. The power monitor, in one embodiment, is a wavelength locker. In one embodiment the wavelength locker provides two signals to a monitoring line 17. The two signals are a measure of optical power at two relatively close wavelengths. The wavelengths may be, for example, about one of the wavelengths used in WDMA communications systems, with each of the fibers carrying signals at 16 different defined wavelengths. The power monitor in another embodiment, is a photo detector with appropriate post processing electronics.

A controller 15 receives intensity information for each of the output signals via the monitoring line. Using the intensity information, the controller computes changes to be made to the optical matrix. The controller instructs the matrix to make changes via a control line 19. In one embodiment the controller includes at least one analog to digital converter (ADC) for digitizing information on the monitoring line, a digital processor for determining commanded mirror positions, and at least one digital to analog converter (DAC) for forming analog signals controlling mirror position. In alternative embodiments the controller includes a digital signal processor (DSP) having ADCs and DACs.

Figure 2:
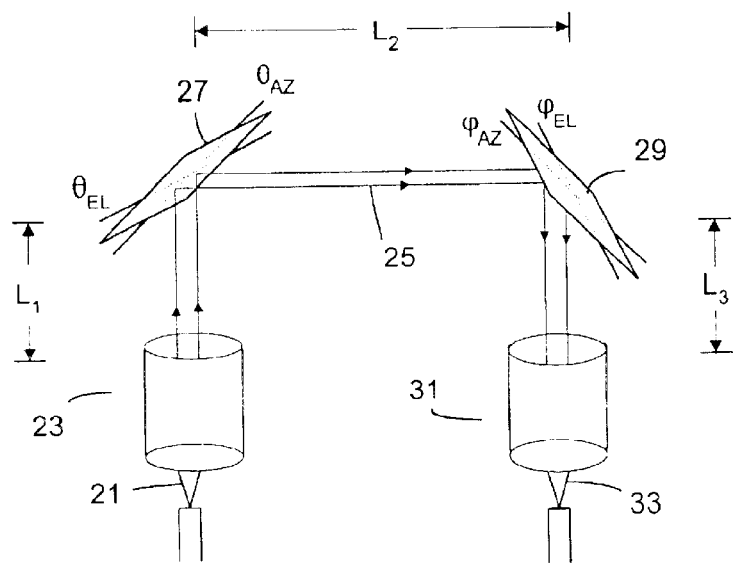
FIG. 2 illustrates an example optical pathway through the switch of FIG. 1, coupling an input and output.

FIG. 2 illustrates a portion of an example optical pathway of the system of FIG. 1. Input light 21 is provided by an input optical fiber. The input light passes through an input collimating lens 23, with the collimating lens one focal length away from the input optical fiber. The collimating lens produces a collimated light beam 25. The collimated light beam is incident on a moveable first mirror 27. The first mirror is an input mirror. The first mirror reflects the light to a moveable second mirror 29. The second mirror is an output mirror. The moveable second mirror steers the beam to a output collimating lens 31, which focuses the collimated light into an output optical fiber.

The first mirror is rotatable along two axis. Rotation along a first axis provides a reflective angle $\theta_{AZ}$, and rotation along a second axis provides a reflective angle $\theta_{EL}$. The second mirror is also rotatable along two axis. Rotation along a first axis provides a reflective angle $\phi_{AZ}$, and rotation along a second axis provides a reflective angle $\phi_{EL}$. As illustrated, the distance from the input collimating lens to the intersection of the axis of rotations of the first mirror is $L_1$. The distance between the intersection of the axis of rotation of the first mirror and the intersection of the axis of rotation of the second mirror is assumed to be $L_2$. The distance between the intersection of the axis of rotation of the second mirror and the output collimating lens is $L_3$.

In operation, the power of the light in the output fiber is dependent on the power of the input light, attenuation of the light as it passes through and is reflected from switch elements, the offset of the light from the central axis of the fiber, and the angle at which the light enters the fiber. Rotation of the mirrors affects the offset of the light from the central axis of the fiber, and the angle at which the light enters the fiber. Maximum output power is attained when the light enters the fiber at and along the central axis of the fiber.

Figure 3A:
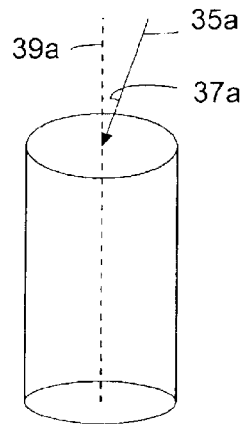
FIGS. 3a and 3b illustrates a light beam and associated pointing angle incident on the output optics.
Figure 3B:
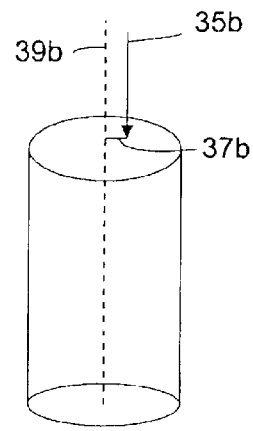

FIG. 3A illustrates light 35a entering a fiber. The light enters the fiber at the central axis 39a of the fiber. The light enters the fiber, however, at an angle AN 37a with respect to the central axis of the fiber. Generally, if the light enters a collimating lens associated with the fiber at an offset the angle AN will be non-zero. Similarly, FIG. 3B also illustrates light 35b entering a fiber. The light enters the fiber parallel to the central axis 39b of the fiber. The light enters the fiber, however, at an offset distance OF 37b from the central axis of the fiber. Generally, if the light enters a collimating lens associated with a fiber at a non-zero angle the offset OF will be non-zero. For the situations illustrated in both FIGS. 3A and 3B the power of the light entering the fiber is less than a maximum.

Figure 4:
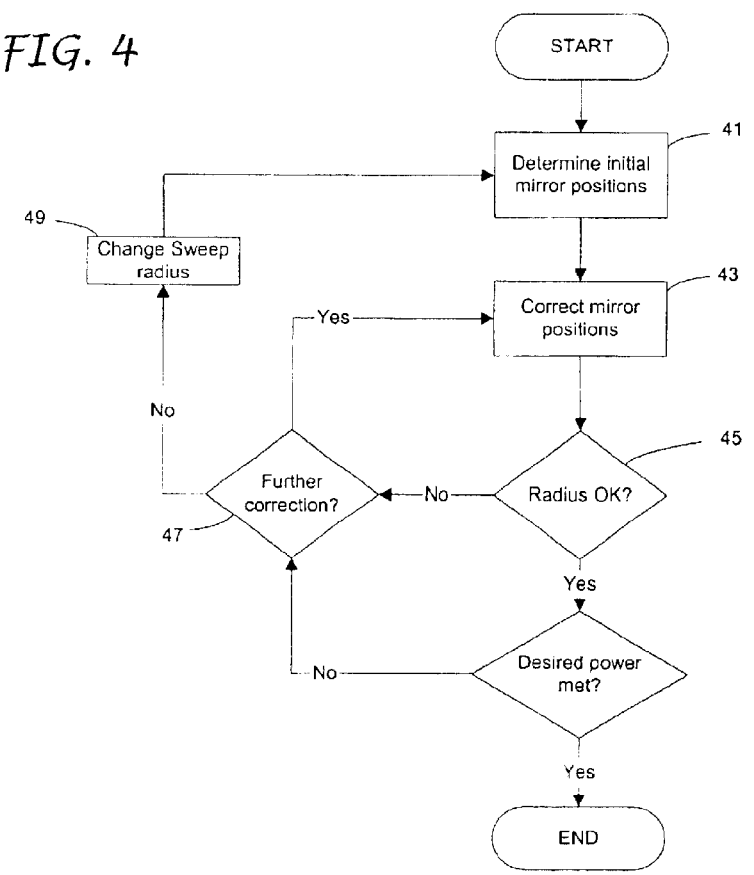
FIG. 4 illustrates a flowchart in accordance with the current invention.

FIG. 4 is a flow chart of a process for adjusting the power of the light entering the fiber. The process adjusts the power by varying the angles of rotation of input and output mirrors of an optical cross-connect switch. In Block 41 the process determines initial mirror positions. In one embodiment this is accomplished by a processor accessing a stored lookup table, with the stored lookup table containing expected positions of the mirror to achieve desired output power for a particular switch configuration. In one embodiment the stored lookup table is set at time of manufacture of the switch, in other embodiments the lookup table is programmable, and in other embodiments the lookup table is updated as a result determination of new positions using the process herein described or substantially similar processes.

In block 43 the process performs a correction of the positions of the mirrors. The process performs the correction by commanding the mirror positions to change slightly in a sinusoidal fashion. More particularly, the mirror positions are changed so as to traverse an offset circle, or vary in position, on output optics providing light to the fiber, with the angle of the light on the output optics varying harmonically with traverse of the offset circle. For example, in one embodiment the angle of the light on the output optics is varied sinusoidally with one revolution taking place over two traverses of the offset circle. Completion of the slower of the two revolutions, whether of position or angle, completes one cycle. The radius of the angle and offset circles are initially set at values expected to provide a less than maximum amount of power.

Output power of the light is monitored during mirror position correction as the mirrors move. Upon completion of a cycle error signals are calculated. The error signals are associated with each of the two angles of rotation of each of the mirrors, and position changes are commanded based on the error signals.

In Block 45 the process determines if the radius is at a minimum value. If the radius is at a minimum value and the desired power is met, the process ends. In some embodiments the process also updates the stored lookup table with a new initial position.

If the radius is not at a minimum value the process determines whether a further correction should be accomplished in Block 47. In one embodiment corrections are repeated a number of times, such as two, four, or eight times, before performing other processing. If less than the number of corrections have been repeated the process continues to Block 43. If the number of corrections have been completed the process reduces the radius of the circle in Block 49. The process then continues to Block 41 and repeats.

Figure 5:
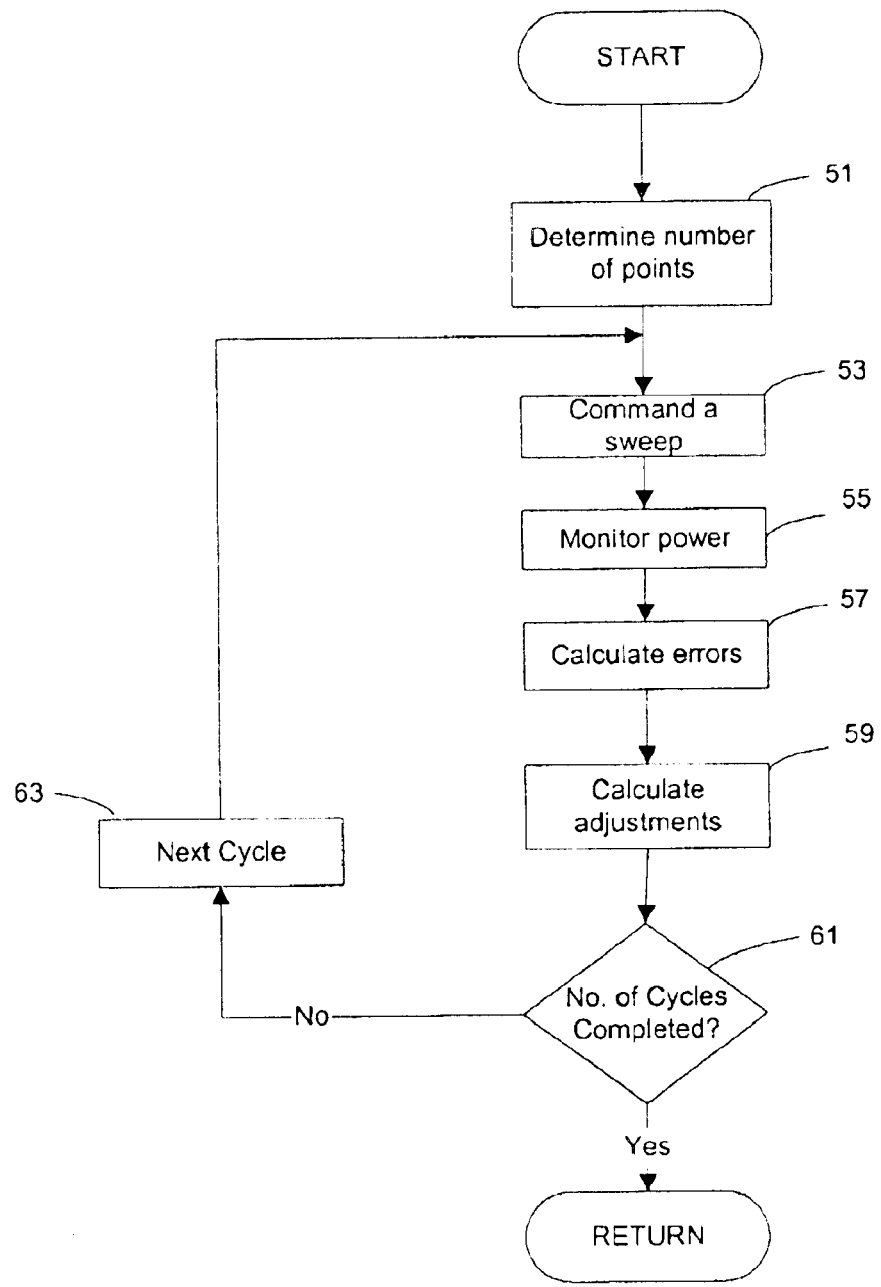
FIG. 5. illustrates a light beam with a varying pointing angle traversing a path on the surface of the output optics.

FIG. 5. is a flow chart of a subprocess for performing mirror corrections. In Block 51 a number of measurement points per cycle is determined. In one embodiment the number of points is eight, while in another embodiment the number is programmable and may be stored in a register of the controller. In Block 53 the process commands a commencement of a measurement cycle. In this regard, the following relationships are used in one embodiment. The mirror angles and offset and pointing angle are related as follows:

$$AN_{AZ} = 2 \cdot (\theta_{AZ} + \phi_{AZ})$$

$$AN_{EL} = 2 \cdot (\theta_{EL} + \phi_{EL})$$

$$OF_{AZ} \cong \theta_{AZ} \cdot (L_2 + L_3) + \phi_{AZ} \cdot L_3$$

$$OF_{EL} \cong \theta_{EL} \cdot (L_2 + L_3) + \phi_{EL} \cdot L_3$$

where $L_1$ is the distance between the inner surface of the input optics and the mechanical axis of the input mirror;

$L_2$ is the distance between the mechanical axis of the input mirror and the mechanical axis of the output mirror;

$L_3$ is the distance between the mechanical axis of the output mirror and the inner surface of the output optics;

$\theta_{AZ}$ is the angle of the input mirror in the azimuth relative to the angle that will generate zero offset and a perpendicular pointing angle, that is, the desired angle, with positive being counter clockwise when the input is to the left;

$\theta_{EL}$ is the angle of the input mirror in the elevation relative to the desired angle, where a change in the positive direction will deflect the beam up when the input is to the left.

$\phi_{AZ}$ is the angle of the output mirror in the azimuth relative to the desired angle with positive being counter clockwise when the input is to the left;

$\phi_{EL}$ is the angle of the output mirror in the elevation relative to the desired angle where a change in the positive direction will deflect the beam up when the input is to the left;

$OF_{AZ}$ is the offset of the beam in the azimuth on the inside surface of the output fiber relative to the center axis, where positive is to the right when the input optics are to the left;

$OF_{EL}$ is the offset of the beam in the elevation on the inside surface of the output fiber relative to the center axis with positive being up when the input optics are to the left;

$AN_{AZ}$ is the angle of the beam in the azimuth relative to the center axis where a positive rotation of the mirrors in the azimuth will result in an positive angle;

$AN_{EL}$ is the angle of the beam in the elevation relative to the center axis where a positive rotation of the mirrors in the elevation will result in a positive angle.

It may be assumed that the input beam hits the input mirror at its mechanical axis. Therefore, the location of the beam on the mirror does not vary as the mirror moves. In addition, the distance, $L_2$, that the beam travels between the input and output mirrors may be assumed to be nearly constant as the mirrors change position. This implicitly assumes that the desired beam position is near the mechanical axis of the output mirror. These assumptions are generally valid for the range of conditions in which optical switches are expected to operate.

With these definitions and assumptions in mind, the following set of equations can be derived:

$$AN_{AZ} = 2 \cdot (\theta_{AZ} + \phi_{AZ})$$

$$AN_{EL} = 2 \cdot (\theta_{EL} + \phi_{EL})$$

$$OF_{AZ} \cong \theta_{AZ} \cdot (L_2 + L_3) + \phi_{AZ} \cdot L_3$$

$$OF_{EL} \cong \theta_{EL} \cdot (L_2 + L_3) + \phi_{EL} \cdot L_3$$

These equations describe the offset and the pointing angle as a function of mirror position and various path lengths through the switch. However, for the purposes of controlling the mirrors, in one embodiment it is preferred that the offset and pointing angles be known, then the corresponding mirror positions be calculated. In this way, a deviation from the desired beam position can be measured, and the mirrors can be moved to the appropriate positions to place the beam at the desired location. Thus, the following inverse equations can be determined:

$$\theta_{AZ} = \frac{2 \cdot OF_{AZ} - AN_{AZ} \cdot L_3}{2 \cdot L_2}$$

$$\theta_{EL} = \frac{2 \cdot OF_{EL} - AN_{EL} \cdot L_3}{2 \cdot L_2}$$

$$\phi_{AZ} = \frac{AN_{AZ} \cdot (L_2 + L_3) - 2 \cdot OF_{AZ}}{2 \cdot L_2}$$

$$\phi_{EL} = \frac{AN_{EL} \cdot (L_2 + L_3) - 2 \cdot OF_{EL}}{2 \cdot L_2}$$

This set of equations provides a relationship between the beam position on the output optics and the corresponding positions of the input and output mirrors. As such, it is possible to observe the signal intensity being output by a port of the switch and move the mirrors by a known amount to maximize the output. In addition, the above equation sets allow not only the maximum coupling efficiency to be achieved, but any desired efficiency less than the maximum.

Accordingly, using eight points for example, the pointing angle and offsets are varied according to:

$$AN_{AZ} = R_{AN} \cdot \cos\left(\frac{N}{8} \cdot 2 \cdot \pi\right)$$

$$AN_{EL} = R_{AN} \cdot \sin\left(\frac{N}{8} \cdot 2 \cdot \pi\right)$$

$$OF_{AZ} = R_{OF} \cdot \cos\left(\frac{2 \cdot N}{8} \cdot 2 \cdot \pi\right)$$

$$OF_{EL} = R_{OF} \cdot \sin\left(\frac{2 \cdot N}{8} \cdot 2 \cdot \pi\right)$$

Where $R_{AN}$ is the radius of the pointing angle circle in radians and $R_{OF}$ is the radius, in millimeters, of the offset circle traced on the output optics. Thus, the beam moves along a circle, with the resolution set by N, the number of points on the circle. In this example, the pointing angle moves through its full range for every 2 rotations of the offset. That is, for every 2 offset circles that are traced on the output optics, the pointing angle varies from $+\theta$ to $-\theta$ and back to $+\theta$ again. This provides an orthogonal relationship between the offset frequency and the pointing frequency, as discussed above. Relationships other than 2:1 may be used.

Returning to FIG. 5, the process monitors output power as the beam sweeps through a cycle in block 55. Once the desired number of cycles has been performed, the process calculates errors in mirror position based on measured output power, as shown in block 57. Power is attributed to offset and pointing angle azimuth and elevation as follows:

$$P_{AN_{AZ}} = \sum_N P \cdot \cos\left(\frac{N}{8} \cdot 2 \cdot \pi\right)$$

-continued $$P_{AN_{EL}} = \sum_N P \cdot \sin\left(\frac{N}{8} \cdot 2 \cdot \pi\right)$$

$$P_{OF_{AZ}} = \sum_N P \cdot \cos\left(\frac{2 \cdot N}{8} \cdot 2 \cdot \pi\right)$$

$$P_{OF_{EL}} = \sum_N P \cdot \sin\left(\frac{2 \cdot N}{8} \cdot 2 \cdot \pi\right)$$

$$P_{TOTAL} = \sum_N P_x$$

Where $P_{ANAZ}$ is the measured power attributable to the pointing angle of the beam in the azimuth direction. Similarly, $P_{OFEL}$ is the measured power attributable to the offset of the beam in the elevation dimension. Analogous definitions apply to $P_{OFAZ}$ and $P_{ANEL}$. The total power delivered by the beam, $P_{TOTAL}$, is the summation of the power attributable to each of the four degrees of freedom, $P_x$.

In turn, the power for each of the four degrees of freedom is equal to the summation of the power provided at each location on the offset circle. After the chosen number of traversals of the offset circle and pointing angle, the integrators are reset so that subsequent power measurements are not effected by the results of previous traversals of the circle.

Once the cycle is completed and the power measurements are known, the measured power is compared to the desired power if less than maximum power is desired. If the objective of the search is to maximize the output power, the algorithm may be run for predetermined number of cycles or continuously. The resulting errors for each of the four degrees of freedom are calculated using the following equations:

$$ER_{AN_{AZ}} = \frac{P_{AN_{AZ}}}{P_{TOTAL}} \cdot \frac{ANO^2}{R_{AN}}$$

$$ER_{AN_{EL}} = \frac{P_{AN_{EL}}}{P_{TOTAL}} \cdot \frac{ANO^2}{R_{AN}}$$

$$ER_{OF_{AZ}} = \frac{P_{OF_{AZ}}}{P_{TOTAL}} \cdot \frac{OFO^2}{R_{OF}}$$

$$ER_{OF_{EL}} = \frac{P_{OF_{EL}}}{P_{TOTAL}} \cdot \frac{OFO^2}{R_{OF}}$$

where the terms are as defined above, and where ANO is the beam angle at which the output power drops by $1/e^2$. Similarly, OFO is the offset distance at which the output power drops by $1/e^2$.

Again referring to FIG. 5, the process calculates new mirror angles in block 59. New mirror angles are computed using equations above. In one embodiment, the error is corrected for over the course of a series of iterations as indicated in Block 61. Accordingly, in some embodiments a small amount of the error, 25% for example, is corrected for during each iteration.

In some embodiments less than maximum power is desired. In one embodiment this is conveniently accomplished by setting the power value for a particular calculation, such as for offset elevation, to a negative value if measured power is greater than desired power i.e. instead of using Px in the algorithm, use $P_{Target}$–Px. In doing so, however, it is useful in one embodiment to traverse small circles and to perform traverses relatively slowly in order to avoid undue switch sensitivity, particularly near areas of relatively steep power drop off.

Accordingly, the present invention provides a controlled optical coupling. Although the present invention has been described with respect to certain embodiments, it should be recognized that the scope of the invention is the claims supported by this disclosure and their equivalents.

What is claimed is:

1. A process of coupling inputs and outputs in an optical cross connect, a particular input and a particular output being coupled by a first mirror moveable in azimuth and elevation and a second mirror moveable in azimuth and elevation, the process comprising:
   selecting a desired output beam power;
   traversing a number of points by a beam provided by the particular input by changing the azimuth and elevation of the first and second mirrors;
   measuring output power provided to the particular output;
   comparing the measured output power to the desired output power; and
   adjusting changes in the azimuth and elevation of the first and second mirrors based on the measured output power.

2. The process in claim 1 wherein traversing a number of points by a beam location comprises moving the beam in a circular path on the surface of output optics associated with the particular output while varying the pointing angle of the beam on the surface of the output optics.

3. The process of claim 2 wherein moving the beam in a circular path comprises moving the beam over a discrete set of points, each point being positioned on the circular path.

4. The process of claim 3 wherein the location of the points on the circular path in the azimuth dimension are defined by $$OF_{AZ} = R_{OF} \cdot \cos\left(\frac{h \cdot N}{8} \cdot 2 \cdot \pi\right)$$

and where the location of the points on the circular path in the elevation dimension are defined by $$OF_{EL} = R_{OF} \cdot \sin\left(\frac{h \cdot N}{8} \cdot 2 \cdot \pi\right)$$

for chosen integer or non-integer values of N and integer value of h greater than 1.

5. The process of claim 2 wherein the pointing angle varies over a chosen range of angles at a frequency that is orthogonal to the frequency at which the beam is traced in a circle on the surface of the output optics.

6. The process of claim 2 wherein the pointing angle varies over a chosen range of angles at a frequency that is a harmonic of the frequency at which the beam is traced in a circle on the surface of the output optics.

7. The process of claim 6 wherein the azimuth component of the pointing angle varies according to $$AN_{AZ} = R_{AN} \cdot \cos\left(\frac{N}{8} \cdot 2 \cdot \pi\right)$$

and the elevation component of the pointing angle varies according to $$AN_{EL} = R_{AN} \cdot \sin\left(\frac{N}{8} \cdot 2 \cdot \pi\right)$$

for chosen integer or non-integer values of N.

8. The process of claim 1 wherein altering the beam location comprises moving the beam over a circular path a predetermined number of times, the circular path being defined by a discrete set of points.

9. The process of claim 8 wherein measuring the output power comprises summing the output power provided by the beam at each point on the circular path for the predetermined number of times the beam traverses the circular path to determine the total power delivered by the beam.

10. The process of claim 1 wherein the beam location is altered if the measured power is not within a specified range of the desired output power.

11. The process of claim 2 wherein the beam location is altered by reducing the radius of the circular path that the beam traverses on the surface of the output optics.

12. The process of claim 1 wherein the process of comparing the measured output power to the desired output power comprises calculating error values indicative of the difference between the measured output power and the desired output power.

13. The process of claim 12 wherein the error values are calculated after the beam has traversed a circle on the surface of the output optics a predetermined number of times.

14. The process of claim 12 wherein the error value in the pointing angle in the azimuth direction is calculated according to:

$$ER_{AN_{AZ}} = \frac{P_{AN_{AZ}}}{P_{TOTAL}} \cdot \frac{ANO^2}{R_{AN}};$$

where the error value in the pointing angle in the elevation direction is calculated according to:

$$ER_{AN_{EL}} = \frac{P_{AN_{EL}}}{P_{TOTAL}} \cdot \frac{ANO^2}{R_{AN}};$$

where the error value in the offset distance in the azimuth direction is calculated according to:

$$ER_{OF_{AZ}} = \frac{P_{OF_{AZ}}}{P_{TOTAL}} \cdot \frac{OFO^2}{R_{OF}};$$

and where the error value in the offset distance in the elevation direction is calculated according to:

$$ER_{OF_{EL}} = \frac{P_{OF_{EZ}}}{P_{TOTAL}} \cdot \frac{OFO^2}{R_{OF}}$$

15. The process of claim 14 wherein for targeted output power level searches, $P_{Total}$ is calculated by using $P_{Target}$−Px if the monitored power is greater than the target power.

16. The process of claim 14 wherein altering the beam location comprises moving the beam in such a way as to compensate for a portion of the calculated error values.

17. A device for selectively coupling light between an input and an output, the device comprising:

a plurality of inputs and outputs, the inputs and outputs adapted to receive and transmit light, respectively;

a plurality of moveable mirrors, the moveable mirrors moveable in an azimuth direction and an elevation direction;

a power monitor, the power monitor measuring the intensity of a beam at at least one of the outputs; and a controller, the controller receiving data from the power monitor, and adjusting the positions of the moveable mirrors in response to intensity data received from the power monitor.

18. The device of claim 17 wherein the controller is a digital signal processor based controller.

19. The device of claim 17 wherein the power monitor is a photo receiver.

20. The device of claim 17 wherein the power monitor is a wavelength locker.

21. The device of claim 17 wherein a moveable input mirror receives light from an input port, and directs the light to a moveable output mirror.

22. The device of claim 21 wherein the moveable output mirror directs the light to an output port.

23. The device of claim 21 wherein the input port includes input optics.

24. The device of claim 22 wherein the output port includes output optics.

25. The device of claim 23 wherein the input optics includes a collimating lens.

26. The device of claim 24 wherein the output optics includes a collimating lens.

27. The device of claim 21 wherein the input port receives light from a fiber.

28. The device of claim 22 wherein the output port provides light to a fiber.

29. The device of claim 17 wherein the plurality of moveable mirrors are micro electro mechanical mirrors.

30. The device of claim 17 wherein at least some of the plurality of moveable mirrors are discrete mirror assemblies.

* * * * *